Feb. 28, 1967  C. J. CRANE  3,307,191
AIRCRAFT BLIND LANDING DEVICE AND FLIGHT DIRECTOR SYSTEM
Filed March 12, 1964  5 Sheets-Sheet 1

FIG. 1

INVENTOR.
Carl J. Crane

INVENTOR.
Carl Crane

3,307,191
AIRCRAFT BLIND LANDING DEVICE AND
FLIGHT DIRECTOR SYSTEM
Carl J. Crane, Box 116, Helotes, Tex. 78023
Filed Mar. 12, 1964, Ser. No. 351,897
3 Claims. (Cl. 343—108)

This invention relates to a system for executing aircraft blind landings. More particularly, in the system of the present invention the pilot has presented to him visually associated indicia, functionally arranged in complementary manner in the aircraft cockpit, those visual stimuli which closely approximate the unseen terrestrial features which enable the pilot to land his craft at a selected location.

Federal regulations prohibit blind landings except under experimental conditions. Blind landings have been made under controlled conditions in which the pilot's safety was guarded by a "safety pilot" who could visually monitor the flight path of the aircraft while the pilot enclosed in a hooded cockpit could view only the flight control instruments. A blind landing of this nature was first made by James Doolittle in 1929. In 1932 a solo flight by Albert F. Hegenberger was made while controlling the aircraft from within a hooded cockpit. These "stunt" blind landings made with low performance aircraft onto landing fields of wide expanse have no modern counterpart in which high performance aircraft must land on relatively narrow runways at high speed. For the reason that there exists no blind landing system visual instrumentation to insure continuously safe blind landings, Federal regulations permit only low approaches to the blind landing. The final landing must be made by visual reference to the runway.

The psychosomatic stress imposed upon the pilot while using present cockpit installed flight instruments is too great to permit safe blind landings. This is occasioned by the multiplicity of "unnatural" indicia which while portraying accurately certain values of turn, pitch, and yaw of the aircraft and/or position information of the aircraft with respect to terrestrial locations, do so in a manner which requires the pilot to:

(1) Mentally evaluate the indications,
(2) Mentally synthesize the aircraft attitude and flight path, and
(3) Mentally establish aircraft location with respect to ground based locations.

It is important to an understanding of the present invention to point out that the pilot, flying an aircraft and reacting to what he sees and feels, is a part of the "closed loop cybernetic" mechanism which guides the aircraft in its path to the landing. When the pilot cannot *see* the terrestrial detail about the aircraft such as when it is obscured by fog his *feelings* which establish his orientation to the earth become unreliable and erroneous and therefore misleading. Therefore, he can no longer react on the controls correctly. When the pilot resorts to viewing conventional flight instruments in order to control the flight path of the airplane and guide it to a safe and correct landing he is confronted with the following tasks:

(1) Maintain spatial orientation, so that the pilot is aware of *his* bodily orientation with respect to the earth, and consequently that of his aircraft.
(2) Navigate the aircraft to the vicinity of the site of landing in a manner which complies with the rules of air navigation.
(3) Guide the aircraft to the landing runway in a safe and well-defined manner called "the approach."
(4) Control the path of the aircraft in order to precisely make contact with the runway; after which the aircraft must be controlled in its "roll out" to a safe stop on the runway within safe limits.

It is well known that even a partially trained pilot can, with suitable instruction maintain spatial orientation by reference to say the conventional artificial horizon under relatively uncomplicated maneuvers.

It is also well known that the physiological phenomenon known as "vertigo" has a pronounced negative effect on the pilot's orientation in space when the pilot uses the conventional flight control instruments during changing paths of flight. This phenomenon may seriously interfere with the pilot's reaction on the controls and may lead to loss of control.

Throughout the years of flight experience, many attempts have been made to invent an artificial substitute for the "seen" view of terrestrial features which the pilot observes thru the windshield, by which he can control his craft to a safe and complete blind landing. No satisfactory systems have as yet been provided.

Accordingly, it is a purpose of this invention to provide a visual reference flight control instrument which will permit blind flight and blind landing of an aircraft.

It is another purpose of this invention to provide a device which will accomplish the navigation, flight control, and blind landing of the aircraft by visual reference to a cockpit mounted instrument presentation which makes use of standard ground based electronic radiators of energy the space patterns of which, and the locations of which, serve to guide or locate the aircraft if it is equipped with suitable "receivers" of the radiated energy.

The commonly used ground installed radio devices for emitting electronic energy which may be translated into visual read-out indications are:

(1) The VOR (Visual Omni-Range)
(2) TACAN (Tactical Air Navigation)
(3) VOR/TAC (A combination of 1 and 2)
(4) DME (Distance Measuring Equipment)
(5) Marker Beacons
(6) Radio Compass Locators
(7) ILS (Instrument Landing System)
(8) Localizer Transmitter (LOC)
(9) GS (Glide Slope)

It is another purpose of this invention to provide a read-out indication of the received signals of one or more of the just noted devices or systems and to present the read-out of one or more of them in such a visually disposed manner that each, or the combination of them, will closely resemble, together with other presented indicia a pictorial approximation of terrestrial features by which the pilot in clear weather manages to control his aircraft along a flight path to a completed landing.

It is a further purpose of this invention to present a blending of electronic responsive indicia and those indicia controlled by other means so that the blending or integration of them provide all the needed visual stimuli to effect a blind landing.

A primary purpose of this invention is to provide a device, the blended indicia of which, serve to so closely approximate the pilot-seen terrestrial features counterpoised with relation to the moving aircraft in clear weather, that vertigo is reduced to an inconsequential threshold.

A secondary but necessary purpose of this invention is to provide novel structure for other indicators which display numerical values of horizontal and vertical aircraft speeds and heights and distance in order that the structure as well as the read-out indications may be effectively combined with the unitary indicia of aircraft spatial orientation.

A further purpose of this invention is to integrate the blended indicia of spatial orientation with those reporting numerical values of rates and distances and locations so that the whole integrated presentation embodies a natural pictorial stimulus which *unburdens* the human pilot's physiological and psychological responses and reactions thus enabling him to manage his aircraft with the untroubled poise that characterizes his clear weather piloting quotient.

A further purpose of this invention is to teach a new system of managing the so-called flare-out portion of the blind landing by the provision of novel structure and novel electronic circuits which together will employ existing ground-based electronic equipment for this purpose.

It is considered highly important to a clear understanding of this invention to list here the indicia which have a marked effect on the psychosomatic responses (balance, vertigo, reaction time, anxiety, indecision) of the pilot as distinguished from other indicia which are indifferent in this respect. The indicia which report the complex movement of the aircraft about its three (3) axes are those responsive to:

(1) Pitch
(2) Turn
(3) Bank

These indicia in the present invention are blended to closely approximate the pilot-seen "picture" of the relative motion between the aircraft and the earth. It is these movements which must be properly associated and blended and presented to the pilot in order to relieve him of the psychosomatic stress which attends blind flight without compensatory visual stimuli. This invention is unique in this respect and for this reason the blended indicia portion which define aircraft spatial orientation is called a "flight gage" to distinguish it from names heretofore given to separate flight instruments which only report portions or parts of the movement of the aircraft in its spatial motions about its three (3) axes.

It is a further purpose of this invention to so associate the indicia of bank, turn, and pitch with those responsive to radiated electronic space patterns that the several grouped together complete a unitary and co-dependent combination which will permit the pilot to "fly" the aircraft to a blind landing without the distraction of moving his visual reference from the single index that represents the pictorial presentation of the device.

In my Patent No. 2,685,226, entitled Aircraft Flight Control Optical Indicating Device, a partial answer to the problem is taught. However, there are very important differences and these constitute highly valued improvements which make the present system far more acceptable in practice and give to it the features that now make the complete blind landing a practical procedure. These differences will be apparent from the following detailed description.

In order to clearly understand the functional relationship of the combination of structure embodied in this invention, it is necessary to define the "anatomy" of an aircraft being landed by a pilot. What the pilot sees and transfers into reaction on the controls of the aircraft (in this example a fixed wing aircraft), is important to present in order that the relationship (and hence combination) of structural elements will be understood in forming the concept of the purpose of the invention.

As the aircraft approaches the selected runway on which it is to land, it has already completed necessary navigational procedure to insure that the airplane is disposed in a path and position which is favorable for completion of the landing. At some point in this flight path the aircraft will enter over the boundary of the runway at a preselected altitude. Thereafter, the aircraft must be guided in a path which will be curvilinear in the vertical plane so that contact with the runway will be gentle. This requires a constant adjustment on the part of the pilot to adjust one or more of the following parameters of the desired flight path adjustment:

(1) Pitch angle of aircraft
(2) Speed of aircraft
(3) Altitude of aircraft
(4) Power adjustment to propulsion system While simultaneously, instantly, and constantly making the noted adjustments which affect the path of the aircraft in the vertical plane, the pilot must also adjust the path of the aircraft in the horizontal plane in order that its path will insure contact with a usable part of the runway. In order to accomplish this the pilot must be instantly, constantly, and simultaneously aware of and responsive to the aircraft (1) Path
(2) Heading Furthermore, while the pilot is adjusting the flight path of the aircraft in the vertical and horizontal planes, he must instantly, constantly, and simultaneously evaluate the position of the aircraft with respect to the runway configuration so that the aircraft will make contact with the runway properly and roll to a safe stop in the distance provided.

To fullfill the need for making safe, completely blind landings, I provide in my invention a system which will permit the aircraft pilot to instantly, constantly, and simultaneously determine, by reference to visual indicia, the responses he must make on the aircraft controls to secure the precise and safe direction of the craft in the blind landing which is the purpose of my invention.

My device embodies not only the visual indicator to which the pilot responds, but likewise certain of the ground installed electronic transmitting equipment. This ground installed equipment, while fundamentally old in general design, is so disposed and modified that it has the unique purpose of cooperatively combining with elements of the device installed in the aircraft for pilot reference as to become inseparably a part of the structural entity of my invention which operates to secure the objectives and purposes noted above. Indeed the utilization of certain modified, but old means of electronic equipment, makes the present invention compatible with respect to the well-understood and readily available ground electronic equipment in common use. This compatibility of combination of airborne and ground equipment brings to my invention the unique capability of presenting to the pilot of the landing aircraft the low level absolute height above the runway as well as the distance along the runway, two factors which either have never been provided by the cooperative operation of ground installed and airborne equipment, or done in an ineffective and indirect manner. Furthermore, in my invention absolute height and distance along runway are presented in the unified instrument in a manner so that they can be used instantly, constantly, and simultaneously with other information of altitude, direction, and path in the manner of the normal clear weather, seen view from the pilot's cockpit.

In radio navigation of aircraft, it is common to employ a series of airway-markers at designated locations along a line of flight. Such a marker comprises a radio frequency transmitter that directs a radio frequency beam vertically upward. Such a marker customarily operates at a carrier frequency of 75 mc./s. (megacycles per second), and is modulated at an audio frequency.

An instrument landing system generally employs two instrument landing markers, namely, an outer marker and a middle marker that are aligned with a radio beam passing over a runway along an inclined glide path that is to be followed by the aircraft in landing. Each of these markers consists of a fan-shaped radio beam projecting vertically upwardly along an axis intercepting the radio beam that is to be followed in landing. Both the outer marker and the middle marker employ carrier waves of 75 mc./s. The outer marker is normally modulated by an audio-frequency wave of 400 c.p.s. Similarly, the middle marker is modulated at an audio-frequency of 1300 c.p.s. Various features of such systems commonly employed are described, for example, in two publications of the United States Government Printing Office identified as Airways Operations Training Series, bulletin No. 1 "Instrument Landing Systems" and Airways Operations Training Series, bulletin No. 2 "Location Markers and Homing Facilities."

Marker beacon receivers employed for detecting such markers, outer markers and middle markers employ a radio frequency receiver tuned to 75 mc./s., a rectifier in the output thereof and a filter arrangement consisting of three band-pass filters connected to the rectifier, the pass bands of the band-pass filters being centered respectively at about 400 c.p.s., 1300 c.p.s., and 3000 c.p.s. The outputs of the three filters operate three corresponding signal lights respectively. The three signal lights are of different colors, such as white, amber and blue. The white light is operated while a 3000 c.p.s. signal is received, thus indicating passage of an airplane over a fan or a Z-marker; the blue light is illuminated when a 400 c.p.s. signal is received, thus indicating when the airplane is flying over the outer marker; and an amber light is illuminated when a 1300 c.p.s. signal is received, thus indicating passage of the aircraft over the middle marker. In practice, blue and amber lights, which flash on and off at approximately 2 and 5 c.p.s. respectively, are employed to indicate whether or not an airplane is flying over the center of the outer and middle markers and also to indicate the departure of the flight path from the center of the markers.

Additionally, in the concept of the present invention a runway boundary marker (runway marker arrays) is provided operating at 3000 c.p.s. modulation and 75 mc./s. This latter marker is employed to activate the system to accept the output of a conventional radio altimeter. The indicia resulting therefrom are presented on the horizontal glide slope bar of a flight gage of the type shown in my previous U.S. Patent No. 2,685,226. Actually, the information may be presented to other conventional indicators of the cross pointer type. Structure for accomplishing this is described in my co-pending patent application entitled "Aircraft Height Indicating Device," Serial No. 345,807, filed February 18, 1964.

Furthermore, in the concept of the present invention, additional marker beacon transmitters (75 mc.) are arrayed in pairs along the length of the runway at selected distances, and modulated at selected audio frequencies in order that their received energy may be used to operate a distance measuring indicator, integrated within the presentation of the invention. This structure is described in detail in my co-pending application entitled "Aircraft Runway Distance Measuring Device," Serial No. 345,808, filed February 18, 1964.

The greatest display of skill on the part of the pilot is demanded in the landing procedure. He is always under stress when estimating his point of touchdown, and the fear of, and danger of undershooting or overshooting the runway is always prominent in the pilot's consciousness. This fact alone is responsible for the grave difficulty now experienced with contemporary instrumentation.

It is futile to suggest that an airplane (fixed wing type) may be landed safely under manual control by pilot reference to only *some* of the flight parameters that are essential to the landing operation. In a normal visual landing the pilot must *see* the aircraft height, and he must *see* his relative position with respect to approach edge and far edge of the runway. He cannot definitely and instantaneously state exact heights and distances but he sees and evaluates them *while seeing* the direction, lateral location and the attitude of his aircraft as he disposes it (flare-out) for touchdown. Therefore in my invention these integrated parameters of flight and landing are presented in a true combined visually associated manner which mimics the familiar seen view from the cockpit of the visual landing.

Accordingly the above noted provisions in my invention are what contribute to fulfillment of the objects and purposes recited above.

Figure 1:
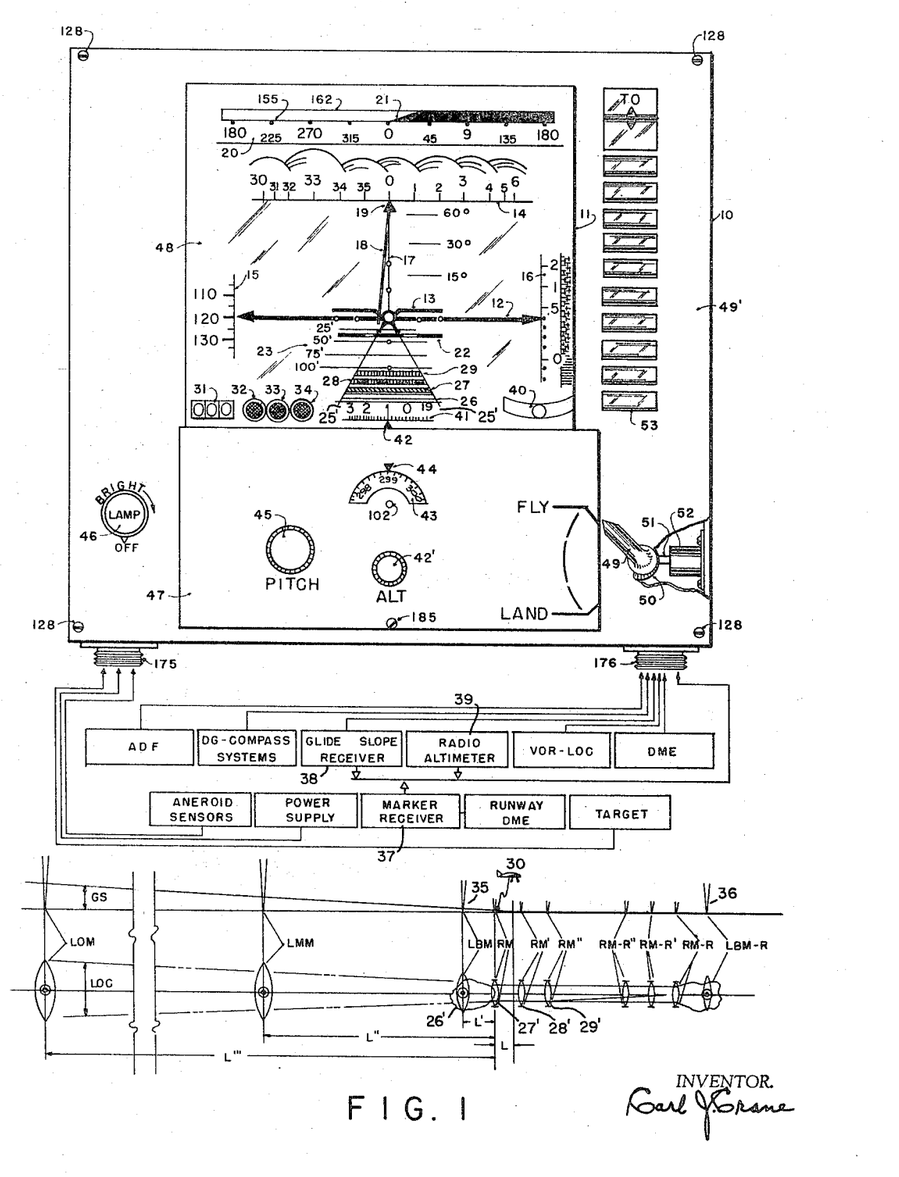
FIGURE 1 shows the blind landing device and system.

Refer now to FIG. 1 which will first be described since the device portrayed there constitutes the visual reference which guides the pilot and stimulates his responses on the controls of the aircraft. The device consists generally of a cube shaped case 10, and the rectangular shaped opening 11 thereto which provides a view of the recessed indicia which form the reference media. In order to maintain spatial awareness with reference to the earth's surface the pilot makes reference to the fixed horizon line 12, the movable airplane index 13, and the rotating card index 14, which is engraved to represent a cloud background upon which is superimposed the angular markings common to a compass card or directional gyro card. It is the movement in pitch (up and down) and roll (left and right) of the airplane index in relation to the fixed horizon line 12 *and* to the stationary or moving compass card 14 which provides spatial orientation for the pilot in the control of the airplane. The airplane index may roll 360 degrees and/or change in pitch through 360 degrees since it is affixed to a vertical axis gyro in a novel manner to be described later.

The preferred form of the invention has the airplane index painted white with a black dot center reference. The horizon line is white with four (4) spaced white dots delineated thereon, the purpose of which will be described below. The background area which gives contrast to the horizon line and the airplane is black as are all areas with exception of the numerals in white and certain other areas of other colors to be described below. The horizon line 12 terminates in pointer arrows both left and right which form the reference indices for the air speed scale (drum) 15 and the vertical speed scale 16. The lubber line 17 procidese a null index for the pointer 18 which moves responsive to one or more sensors which function as is described below. The upper end of the element 18 appears to hinge at the index 19 which serves to index the compass card 14. Above the compass card, the scale 20 provides for indicating the azimuth of a ground based radio transmitter-antenna in reporting direction by means of the ADF (automatic direction finder) installed in the airplane. The pointer 21 moves left and right to indicate azimuth from 0 to 180 degrees left, and 0 to 180 degrees right.

The horizontal pointer 22 performs two functions, namely, (a) that of indicating deviation above or below the glide path of the ILS (Instrument Landing System) by its relative position with respect to the horizon line 12, and (b) the indicating of height of the airplane above the runway by its position with respect to the scale 23 (quantitively) or qualitatively by its position with respect to the airplane index 13 and/or the horizon line 12. The radiating lines 24 of the scale 23 serve to determine exact height alignment when the pointer 22 is acting responsive to the radio altimeter installed in the airplane.

My co-pending patent application entitled "Aircraft Height Indicating Device," Serial No. 345,807, filed February 18, 1964, describes the structure for providing alternate use of the pointer 22 either for glide slope deviation or for height above the runway, the latter being most usefully employed while effecting the flareout for the blind landing.

The radiating lines 25 and 25' serve to represent the landing runway and at the wide (entry) end of this configuration there are disposed the images of four plastic (Plexiglas) bars 26, 27, 28, and 29, which when illuminated in sequence report the arrival of the aircraft at known distances ahead of (boundary marker) and along the runway as can be noted in the schematic system portion of FIG. 1. In the event the airplane position is that shown at 30 wherein the boundary marker 26' and the edge marker 27' had been passed then the bars 26 and 27 would be illuminated. After the airplane passes the runway markers 28' and 29' then the plastic bars 28 and 29 would be illuminated. The illumination of the bar 29 is intermittent as a special warning feature, for by the time the airplane has passed the marker 29' it must have landed and be rolling to a stop. If not, the flashing or pulsing illumination of the bar 29 will require the pilot to abort the landing and try another approach.

The digital read out counter 31 reports the slant distance to a selected ground station and reads in miles.

There are three marker beacon lamps, 32, 33, and 34, which respond to the passage of the airplane within the radiated space energy of marker beacons. The lamp 32 responds to the 400 c.p.s. frequency band which is transmitted by the ground based transmitter operating on a carrier frequency of 75 mc. This particular marker is known as the outer marker and when associated with a low frequency non-directional transmitter is identified by the symbol LOM, as noted in FIG. 1. The outer marker lamp 32 emits a blue colored light. The lamp 33 which responds to the transmission from the middle marker (LMM, FIG. 1) emits an amber light and responds to the filtered audio frequency of 1300 c.p.s. In my invention use is made of the now non-standard location of a marker beacon placed at the distance L' (approximately 1,220 feet) from the approach end of the runway as shown in FIG. 1. This disposition provides for a glide slope intercept of 100 feet (for a 3 degree glide slope) which will permit the airplane to intercept the runway at a distance of about 700 feet beyond the approach end of the runway. The lamp 34 will respond with a white emitted light to the transmission of this boundary marker transmitter which in my invention is associated with a low frequency non-directional (ADF) transmitter and is identified in FIG. 1 as LBM. The filtered audio frequency of 3000 c.p.s. is that used by the LBM boundary marker. This frequency is also common to the airways fan markers.

In my invention the boundary marker (LBM) beacon provides for an additional function, namely that of causing a switching of the glide slope receiver output *from* the pointer 22, and simultaneously switching the output from the radio altimeter *to* the pointer 22. This operation and structure to accomplish it is described in detail in my co-pending patent application entitled "Aircraft Height Indicating Device," Serial No. 345,807, filed February 18, 1964. At the moment the output transfer just described takes place, the pointer 22 will deflect to its full scale deflection down, assuming of course that the aircraft at that moment is at, or above 100 feet elevation above the runway. In FIG. 1 it should be noted that the runway extension areas 35 and 36 between the boundary (and at it) marker antenna site must be on grade with the runway surface or very nearly so in order to present adequate indicated height representation to the pilot by a steady movement of the pointer 22 as he prepares to use its simulation of the runway surface as a gage for the flareout procedure preparatory to landing.

By further reference to FIG. 1 it can be noted that the schematic relationship is there shown between the marker receiver 37, the glide slope receiver 38 and the radio altimeter 39, which relationship and structural embodiment constitute a very important novel feature of my invention. This relationship and function is further portrayed in the diagram shown in FIG. 12.

The ball bank indicator (or slip indicator) 40 is of well known design. The scale 41 and its index 42 constitute the read-out of pressure altitude. This drum type scale portrays altitude between the zero and 20,000 feet and accordingly is an *approach altimeter* simple in design, in which the shown numerals represent thousand foot intervals. This altimeter may be set to accommodate its reading to barometric changes by means of the setting knob 42' while observing the scale 43 movement against the index 44.

The pitch adjusting knob 45 is used to raise or lower the horizon line 12 so that the airplane index 13 may register precisely as shown in FIG. 1 to indicate level flight under varying load conditions of the airplane. So adjusted the horizon line may appear slightly above or below the arrow heads which are the reference indices for airspeed and vertical speed. This departure at once signals the pilot of a proper disposition or a selected one.

The lamp knob 46, connected to a suitable rheostat controls the light intensity of the lamps which illuminate the indicia so far described. A drawer 47, the front face of which contains the elements 42' to 45 inclusive, can be withdrawn to expose much of the mechanism which controls indicia just described. A partial mirror 48 both transmits and reflects light and in so doing permits the super positioning of some of the indicia upon the images of others to obtain the desired integration of indicia of the various flight parameters.

The switch handle 49 engages a shaft and cam 50 which rides adjacent the switch plunger 51 of the switch 52. The purpose of this switch is to shift the various circuits of electronic devices needed only for landing functions into readiness when a landing becomes imminent. The switch handle is left in the "fly" position at times other than when the "land" mode is selected.

Figure 11:
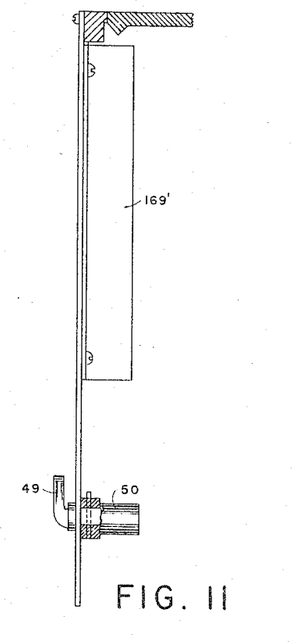
FIGURE 11 is side view of front cover plate with attached mode switch actuator and flag alarm signal box.

In the United States the common system of electronic airways guidance is provided by the VHF frequency visual omni-range (VOR) beacons, located at points along the airways and at destinations. The proper path of the airplane along the airways is secured by tuning the airborne VOR–LOC receiver to a given range station and either flying "to" it or "from" it. All types of receiver-indicator devices for utilization of the VOR–LOC signals employ some form of indicator which shows a "to" or "from" flag. In addition most indicating devices have "flag alarm" indicators to show the failure of operation of a given indicating element and this flag is usually placed near or over the indicator itself. In my invention the circuits which supply the flag alarm elements (miniature galvanometers) and also the "to–from" indicator are grouped into one assembly 169' which is fastened to the back of the (FIG. 11) instrument face plate 49' so that the various indicating elements may be viewed through the column of windows shown above the window 53.

In the schematic portrayal of sensors whose outputs are fed into the blind landing device it will be noted that the block representing the runway DME (distance measuring equipment) is connected to that block representing the marker receiver. This elaboration of the marker (beacon) receiver is described in detail in my co-pending patent application noted above, namely "Aircraft Runway Distance Measuring Device," Serial No. 345,808, filed February 18, 1964.

This elaboration of the conventional (old) marker beacon receiver, used together with the elaboration of conventional (old) marker beacon transmitters, modified, and re-arranged and the whole provided with an airborne read-out for a new purpose, the same being visually integrated to supply maximum human pilot response for determining instantly the aircraft position along the runway is a major factor in permitting my device and system to constitute a hitherto unrealized solution to the manual blind landing.

Further study of the schematic diagram part of FIG. 1 without which the blind landing device is incomplete will show that my device is prepared to receive the output of any known aerial navigation sensor system now in common use, and accordingly provides the very novel feature of *compatibility* with existing and future navigational aids for defining the landing path. This is factual because the read-out of my invention is the fundamental equivalent of the normal visual landing.

It will be noted in the portrayal of my elaboration (improvement) of the ILS method of blind approach as shown in lower part of FIG. 1 the following general aspects are the preferred configuration:

Glide Slope Angle=$GS$=3 degrees.

Distance $L$=700 feet=distance from approach edge of runway to touchdown.

Distance $L'$=1220 feet=distance from boundary marker (LBM) to approach edge of runway.

Distance $L''$=7770 feet=distance between middle marker and boundary marker.

Distance $L'''$=5.9 miles=distance between outer marker and middle marker.

It will also be noted that a given runway may be equipped for approach in either of two directions so that the runway marker transmitter pairs identified in FIG. 1 as RM, RM' and RM'' have their counterpart when landing is made over the area 36 in RM-R, RM-R' and RM-R'', and LBM-R'.

It will be obvious that departures from the preferred configuration may become necessary due to terrain factors or aircraft performance factors.

Figure 2:
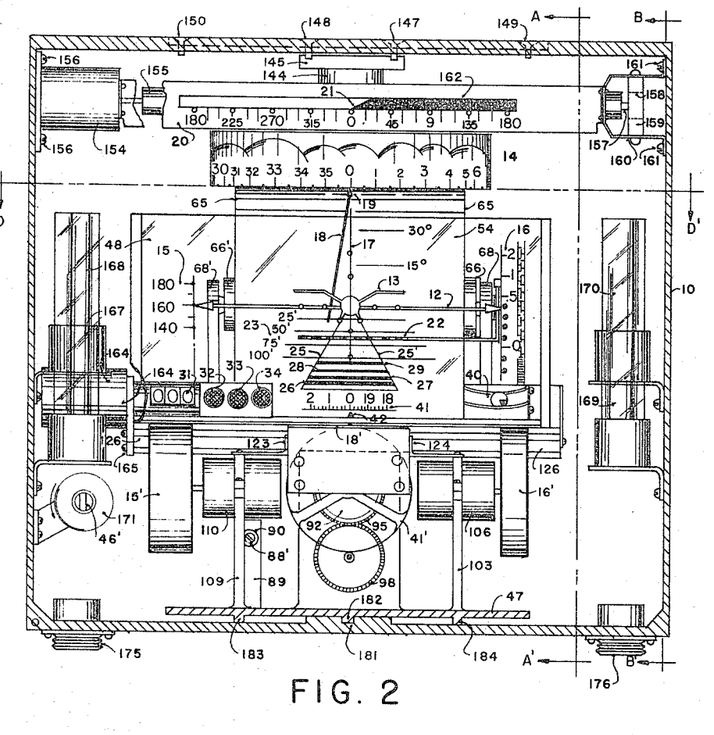
FIGURE 2 shows a partial cut-away vertical front view of the blind landing device, with the section taken substantially on the line C–C' of FIG. 3.
Figure 3:
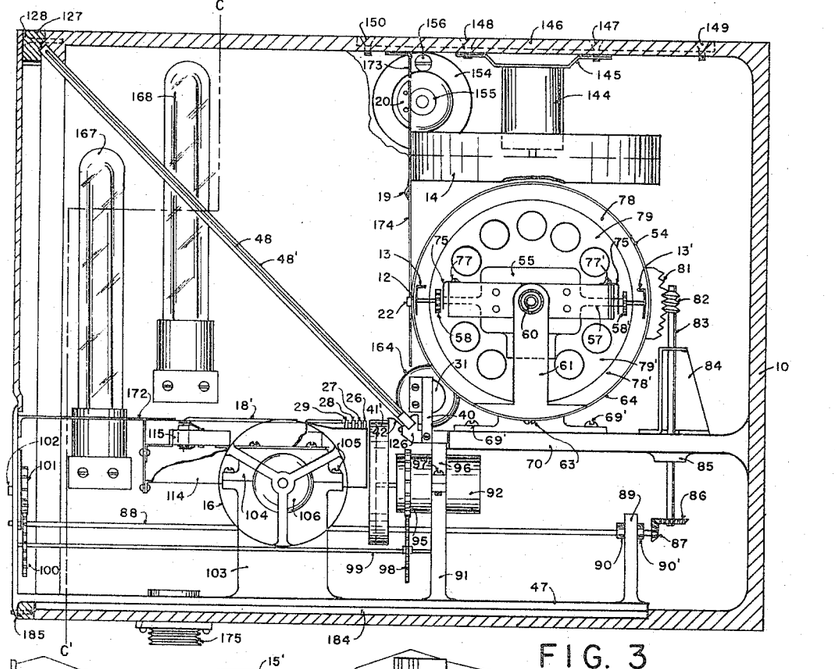
FIGURE 3 shows a partial cut-away sectional side view of the device with the section taken substantially on the line A–A' of FIG. 2.
Figure 4:
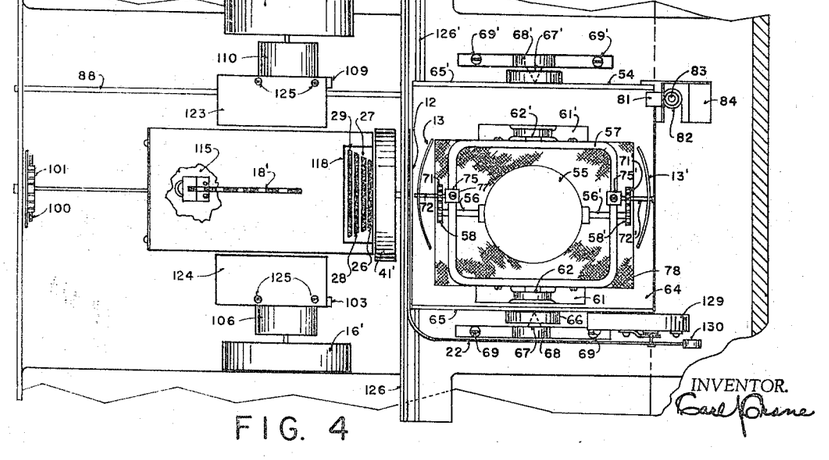
FIGURE 4 is a partial cut-away plan view of the central portion of the device taken substantially on the line D–D' of FIG. 2.

Attention will now be directed to FIG. 2 and FIG. 3 and FIG. 4 for a more detailed study of the structure of my blind landing device.

Figure 10:
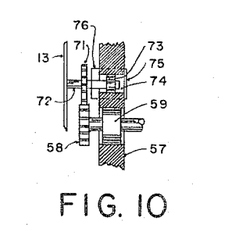
FIGURE 10 is a section of vertical gyro gimbal ring, at location of vertical gyro housing, support shaft bearing, and roll index shaft and bearing.

It is thought appropriate to state here that my blind landing device has no counterpart in contemporary *practice* among various so-called flight director indicators or course indicators. The newest approach in the art is exemplified by the teaching of my Patent No. 2,685,226 entitled "Aircraft Flight Control Optical Indicating Device." The device described therein is bereft of the important flight indicating elements which show, in highly realistic form the runway proximity during landing, and the runway distance traversed during the landing and roll out. Furthermore my patent just noted, while including the basic elements needed for spatial awareness, contain an error producing factor, slight at low roll angles, but large at high roll angles. This error is introduced by the banking of the airplane index which has the effect of producing a pitch error which increases with the bank angle, and causes likewise a displacement of the airplane index both left and right of the lubber line. These errors while inconsequential at low bank angles are not now acceptable in the practical application of flight director indicators. However the philosophy of spatial awareness with respect to terrestrial references as well as to electronic space patterns is well taught in the above noted patent, and brought to a high degree of perfection by the improvements now to be defined. In the instant invention spatial awareness is achieved by the accurate proportioning of the seen (indicia 12, 13 and 14) composite movements, in degree, rates and quality of those elements which report on pitch, roll and turn. These are respectively represented by the airplane index 13, the horizon line 12 and the turn reference 14. Taken together these visual references artificially replace the natural pilot's view during visual flight. The basic novel mechanical element which now makes possible the correct relationship between bank and turn indicia is the arrangement of the vertical axis gyro assembly 54. This assembly consists of a vertical axis gyro either electrically driven or air driven and provided with any of the erection systems now old in the art, and contained in the housing 55. Suitable housing shafts 56 and 56' extend as shown, are journaled in the gimbal 57 and terminate in small spur gears 58 and 58'. Suitable ball thrust bearings 59 (FIG. 10) serve to accurately position the gyro housing and connecting shafts and are pressed into the gimbal ring 57. The gears 58 and 58' are bonded to the shaft ends by suitable heat responsive solder or by other means. The gimbal 57 is itself supported by means of ball bearings 60 and 60' which are positioned in the pedestals 61 and 61'. Stub shafts 62 and 62' affixed to the gimbal engage the ball thrust bearings 60 and 60'. The pedestals 61 and 61' are fastened by means of screws 63 and 63' to the inside lower contour of the plastic (Plexiglas or equal) cylindrical transparent case 64 which has closure ends 65 and 65' bonded to the case 64. These closure ends have bosses 66 and 66' of plastic bonded to the closure ends which have conical depressions in order to receive the support pivots 67 and 67' which are fitted into the upper ends of the support pedestals 68 and 68'. These latter pedestals are fastened by means of screws 69 and 69' to the shelf 70 which is cast integrally with the box-like case 10.

Figure 7:
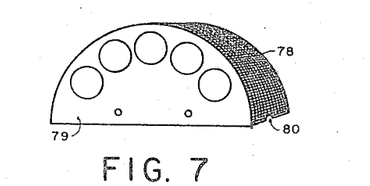
FIGURE 7 shows detail of vertical gyro upper masking hood.
Figure 8:
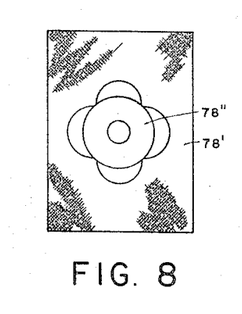
FIGURE 8 is a view of vertical gyro lower masking hood showing zenith markings.
Figure 9:
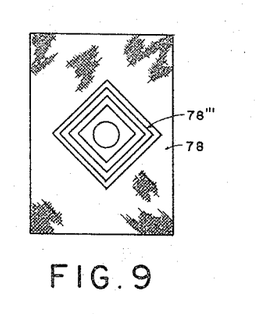
FIGURE 9 is a view of vertical gyro upper masking hood showing nadir markings.

The gears 71 and 71' mesh constantly with the gears 58 and 58' and are of equal diameter so that for each revolution of the shaft 56 (and 56') there is one revolution of the shaft 72 (and 72'). These latter shafts are affixed to the gears 71 and 72') and support the indices 13 and 13', which are bonded to the shafts. The shaft 72 (and 72') extends into the ball (radial) bearing 73 which is pressed into the hole 74 in the gimbal 57. The shaft (72 and 72') is retained in proper position as shown by means of retainer clips 75 and 75' (FIG. 10) which are provided with one forked end which engages an annular groove 76 in the shaft 72. The other end of the angle clip 75 is provided with a hole which engages the screws 77 and 77' which attach the retainer clips to the gimbal. Two fine mesh screen assemblies (FIG. 7) 78 and 78' with side walls 79 formed in cylindrical form serve as a background cover for the gyro and gimbal mechanism. They are attached as shown by screws to the gimbal and small semi-circular holes 80 (FIG. 7) serve to pass the shafts 72 and 72'. FIG. 8 shows the *lower* half of the screen assembly with its symbolic marking 78'' that represents a cloud pattern seen from beneath. It is this marking which will appear centralized on the horizon line 12 when the airplane is flying straight up. The representation 78''' shown on the upper half of the screen assembly in FIG. 9 is symbolic of a plowed field and this marking will appear centralized on the horizon line 12 when the airplane mounting the instant invention is flying in a vertical dive. Further discussion of these indications will appear below. Accordingly the exterior view of the gyro assembly shows two airplane indices 13 and 13' disposed 180 degrees apart against a black fine mesh screen background within the plastic case 64. The case itself serves as a dial for engraving and portraying the indicia 12, 23, 25 and 25' and 17.

It will be noted that these dial engravings are only on the front side of the gyro case. The rear side of the case is fitted with a gear sector 81 which is bonded to the case in such a manner to engage the worm 82 which is affixed to the worm shaft 83 which is supported in a bracket 84 fastened to the shelf 70 which latter also contains a bushing 85 which acts as a thrust washer and radial support for the shaft 83 which has its lower end fitted with a bevel gear 86 which engages another bevel gear 87. This gear is attached to the shaft 88 which is journaled in the pedestal 89 and held against linear movement by two collars 90 and 90' which are pinned to the shaft 88. The pedestal 89 forms a part of the drawer 47 the front face of which serves to support among other items the forwardly extending end of the shaft 88. Rotating the shaft 83 by means of the knob 45 causes the gyro cases 64 to rotate in order to raise or lower the horizon line 12 and other associated indices. The pedestal 91 supports either an altimeter mechanism within a cylindrical case or as shown in the drawings, a synchro motor 92 which is responsive to the movement of the shaft of an aneroid (pressure) type altimeter movement 92' located remotely as shown schematically in FIG. 12 in which a synchro generator 93 transmits the altimeter shaft 94 movement to the dial 41'. It is well known that different performing aircraft require instrument readings of different values and ranges so no markings of altitude are shown on the drum dial 41'. However in FIG. 1 the *reflected* image of the drum 41' is shown to have a reading 41 with a range of 20,000 feet. The synchro motor 92 is fitted with a ring gear 95 bonded to the case as shown and the case of the synchro motor is pressed into the inner race of a ball bearing (not shown) whose outer race is clamped between the cap 96 and the pedestal itself and securely held there by means of the screws. A gear 98 has its hub bonded to the shaft 99 which extends forwardly to engage the gear 100 which is bonded to the shaft. The forwardly extending terminal end of the shaft 99, reduced slightly in diameter to form a shoulder for bearing against the inside surface of the vertical drawer front 47 terminates by engaging the adjusting knob 42' shown in FIG. 1. The gear 100 meshes with a dial and gear assembly 101 which has a stub hub 102 which extends through the drawer front for suitable positioning. The lower dial portion of the assembly 101 extends between the vertical drawer front and the gear 100 and is retained there by this means. The front surface of the dial may be seen thru the aperture 43 (FIG. 1) in the drawer front. The calibration of this dial is in inches of mercury a method common to the altimeter dial setting on pressure altimeters. The pedestal 103 of the drawer, together with its cap 104 and retaining screws 105 positions a synchro motor 106, the shaft of which engages the vertical speed drum 16'. The synchro motor 106 is driven by the synchro generator 107 which is shaft connected to the vertical speed sensor mechanism 108 of any acceptable design. In like manner the pedestal (FIG. 4) 109 and its cap fixedly positions the synchro motor 110 which is shaft connected to the airspeed drum dial 15'. This drum dial through its synchro motor and electrically connected synchro generator 111 positions itself in response to movement of the airspeed meter mechanism 112 by means of its extended shaft 113.

The mirror 48 is bound in a light slotted metal frame 48' into which it slips. The frame seats in a groove 126 in the up turned projection 126' of the shelf 70, and the frame upper edge is contained between the upper case edge and the bezel ring 127. The latter is fastened to the case by means of screws 128.

Figure 12:
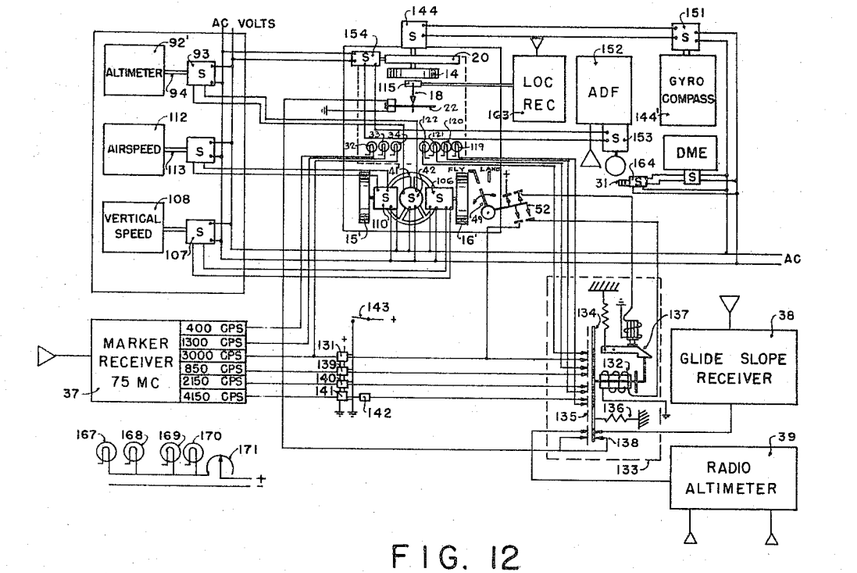
FIGURE 12 is schematic diagram of electrical and electronic circuits and components.

It is noted that no electrical conductors are shown leading to various elements in the interest of clarity of presentation FIG. 12 adequately teaches the electrical connections of various elements.

Figure 5:
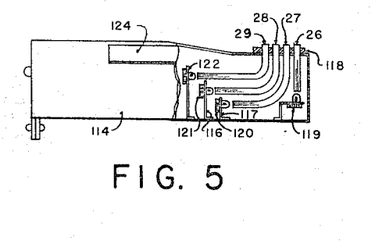
FIGURE 5 is a cut-away side view of the runway marker lamp and localizer indicator assembly.
Figure 6:
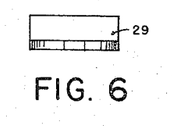
FIGURE 6 is a detail drawing of one runway marker beacon lamp projector indicator.

The box-like structure 114 (FIG. 5) contains the four marker lamps which illuminate the plastic bars 26, 27, 28, and 29. This structure 114 also houses the galvanometer 115 which drives the pointer 18' which as shown in FIG. 12 is responsive to the VOR omni-receiver bearing output or to the ILS-LOC output, or in fact as shown in my Patent No. 2,685,226 identified above to any bearing sensor which choice may demand. The reflected image 18 of the pointer 18' is brought about by the translucent mirror 48 set at an angle of 45 degrees to both the plane of the pointer (18') sweep as well as to the plane which includes the horizon line 12, the drum (foremost) surface of the dial 14 and the scale 20 as well as the marker lamps 32, 33, and 34 and the ball bank indicator 40. The plane which includes the pointer sweep of pointer 18' also includes the topmost position of the drum dials 15' and 16' and the tips of the plastic bars. These bars after forming are plated with a reflecting metallic coating so that no light from one is transmitted to the other and each lamp support bracket has its upwardly extending ends arranged to shade adjacent bar light receptor ends. A plastic bulkhead 118 is formed around and cemented to the exit ends of the plastic bars and the bulkhead itself is bonded to the top of the box 114 thus firmly holding the assembled plastic bars. The lamps 119 to 122 inclusive respond to the output of the boundary marker and runway marker filtered circuits as shown in FIG. 12. The box 114 has appended brackets 123 and 124 which are bonded to the box as shown and the whole assembly is then fastened in place on top of the pedestal caps 103 and 109 by means of screws 125.

The horizontal pointer 22 is driven by the galvanometer 129. The pointer is restrained in a null position opposite the horizon line 12 on the plastic gyro case by means of the standard galvanometer spring mechanism. The pointer is counterbalanced by the weight 130. When current (up to 150 microamperes maximum) passes thru the galvanometer in one direction the pointer will be lowered from the null position and when the current is reversed the pointer will deflect in the upward direction. This galvanometer is under the output influence of the glide slope receiver, and as is well known will indicate the aircraft position either above or below the established ILS glide path. In the instant invention however when the aircraft passes the boundary marker LBM in the landing mode the 3000 c.p.s. filtered circuit from the marker receiver supplies current not only to the marker lamp 34 but likewise through the latching relay 131, and through the switch 52 (FIG. 12) to the coil 132 of the switching relay 133. This causes the relay armature 134 to move to the position defined by the line 135 against the spring 136 tension where it is held by the latch 137. At this moment the galvanometer 129 and its pointer 22 become responsive to the output of the radio altimeter 39 as a result of the closure of the switch 138. This condition maintains during the further flight and landing of the aircraft and as each succeeding pair of runway markers are traversed, the marker receiver filters the corresponding energy of each band, namely, 850 c.p.s., 2150 c.p.s., 2150 c.p.s. and 4150 c.p.s. successively. As each circuit is energized the individual latching relays 131, 139, 140, and 141 will hold the circuits energized in order that the plastic bars will retain their lighted configuration until the switch 52 is again returned to the "fly" mode. The flasher 142 additionally causes the plastic bar 26 to pulse with light as an additional warning signal that the marker position RM" has been traversed. The switch 143 when closed unlatches the latching relays 131, 139, 140, and 141.

The drum dial 14 which is shown responsive to any of the several available gyro stabilized compass systems 144', may also be made responsive to a remotely located directional gyro. The card or dial 14 is driven by a synchro motor 144 and in FIG. 3 is shown attached to a base 145 which is affixed to a plate 146 by means of screws 147 and 148. The plate itself is fastened into the recessed aperture in the case top by means of screws 149 and 150. A synchro generator 151 (FIG. 12), a functional part of the compass system 144', transmits heading information to the synchro 144 for read-out at the index 19. It is important to note that unlike all contemporary flight director systems (none show the fundamental turn relationship in visual association with pitch and bank indicia), the instant invention clearly depicts the fused relationship which produces the normal visual flight stimulus.

Refer to FIG. 1 and note that in the instant invention the card 14 delineation will move from left to right for a left hand turn in which case the left banked index 13 will combine to present the same stimulus to the pilot's eye as he sees in the normal visual flight condition. Obviously a right turn causes the card 14 to move from right to left so that all responses to pitch bank and turn are physiologically normal.

The automatic direction finder (ADF) 152 is equipped with synchro transmitter 153 which in turn controls the synchro motor 154 to which is attached the long tubular member 155. The synchro 154 is suitably located by screws 156 to the inside wall of the case 10. The far right end of the tube 155 is fitted with a small stub shaft 157 which engages a ball bearing 158 located within the block 159 which is contained by the bracket 160 affixed by screws 161 to the inside wall of the case 10. The bracket 160 also supports a dial scale 20, the other end of which engages the synchro to which it is riveted as shown. A slot 162 in the dial permits the viewing of the surface of the tubular member 155. The scale of radio bearings engraved on the dial is arranged with zero at the center or lubber's line. The scale extends to 180 degrees right through 45, 90 and 135 degree markings, and to the left to 180 degrees through 315, 270, and 225 degree markings. This system provides for a full 360 degree bearing information while keeping the indication parallel to and adjacent the heading dial 14. The tube 155 is provided with a diagonal marking on the tube so that as it rotates there appears to be an arrow point 21 movement to and fro to designate the bearing to a given ground based transmitter.

The localizer receiver 163 employed in the ILS-NAV system transmits its read-out to the pointer 18' which is available also for receiving the output of other computed navigation data or for serving as one of the pointers to which can be fed target information so that similar information supplied to the horizontal pointer will provide a target aiming point.

The synchro 164 fitted with a bracket 165 which also engages a counter 164' for purpose of counting miles in the DME system is affixed by means of the screws 166 to the edge of the up turned portion of the shelf 70.

The various scales are illuminated by means of the four filament lamps 167, 168, 169, and 170. The lamps are fitted with suitable sockets shown and these have affixed thereto brackets for attaching the lamps in position on the inside walls of the case 10 as shown. A rheostat 171 also affixed to the case wall provides a means of controlling illumination to the indicia of the device.

Only the indicia and dials are illuminated while all other areas are covered with a black flock such as 172, 173, and 174 so that no unwanted reflections destroy the ease of reading the integrated indicia through the aperture 11 of the device.

Electrical connector fittings 175 and 176 serve to receive the output circuitry and power supply lines.

The drawer 47 with upwardly extending pedestals for supporting various elements slidably engages the grooved (181 of FIG. 2) slot of the base of the case with its central rail 182. Two other rails 183 and 184 ride on the inside surface of the base of the case. When the drawer is in operating position the cap 96 of the pedestal rides snugly underneath the ledge of the shelf 70 to maintain a tightly positioned location. The retainer screw 185 locks the drawer in position by engaging the bezel ring 128.

The galvanometer 115 which drives the pointer 18 is responsive to the localizer receiver 163 or may be made responsive to any computed output the purpose of which is to assist in capturing the VOR course or the localizer course of the ILS system.

The use of color in identification of the marker beacon lamps is extended to the dial of the vertical speed meter as shown in FIG. 1 and FIG. 2. That portion of the vertical speed dial which indicates rate of descent is tinted amber or yellow so as to imply caution, while that portion which indicates rate of climb is tinted green.

It is also noted that the recessed indicia of the blind landing device have the effect of eliminating reflections from external lights or objects, and the recessing provides a natural depth dimension which is pleasing and readily focused by the eye as all indicia reside in the same plane.

Figure 13:
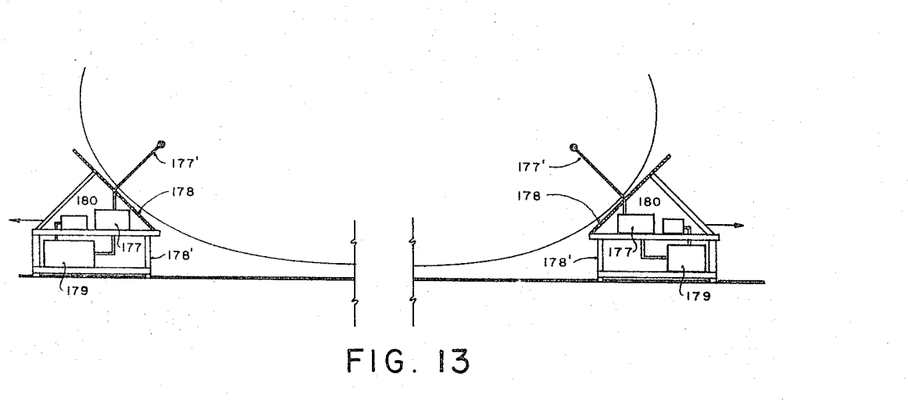
FIGURE 13 shows the paired disposition of runway marker transmitters and associated devices.

In order to secure a high reliability factor of runway marker beacon operation during the crucial period of landing it is noted in the drawings that the runway marker transmitters are disposed in pairs. Refer now to FIG. 13 in which is shown the facing runway marker transmitters 177. Each employs a half-wave dipole Yagi type of antenna 177' located with a reflector 178 and tilted as shown. The supporting structure 178' properly weather proofed includes a single self-contained low power, single band 75 mc. transmitter having the exact audio frequency for the particular location. The transmitters are supplied by a battery 179 which is charged by suitable charger unit 180 supplied by power from, and switch controlled from, the airport control tower.

Refer now again to FIG. 1 where it will be noted that the presentation indicates all the needed flight parameters for a blind landing.

To explain this assume that the airplane is landing on runway 36 or a heading of magnetic north. With no cross wind component the airplane has been directed down the glide slope of the ILS facility by keeping the horizontal pointer 22 superimposed upon the horizon line 12 the airplane index 13 is shown disposed in level flight and the vertical pointer 18 has been used to maintain the airplane on the extended center line of the runway. The stabilized compass card reads zero and the ADF pointer (ADF tuned to LBM-R, FIG. 1) reads zero. Airspeed is 120 m.p.h. and the rate of descent is 400 feet per minute. Each of the approach markers have been passed including the boundary marker. The pressure altimeter shows a reading of 1000 feet (above sea level). The radio altimeter has been automatically connected to the pointer 22 which *shows* the airplane to be about 40 feet above the runway. So if the rate of descent is 400 feet per minute the airplane should touch down in about 6 seconds. The pilot noting that his position (from runway distance signals) is over the runway, as shown in FIG. 1 at 30 the pilot will slowly increase the pitch of the airplane until the wheel symbols of index 13 are about on the horizon line 12. This will decrease the airspeed and rate of descent to about 110 m.p.h. and 200 feet per minute respectively, with power output maintained, as the pointer 22 approaches the airplane index 13 wheels for a smooth landing. At this moment the pointer 22 is coincidental with the horizon line 12, power is chopped and the airplane begins the roll out. The pilot now gives full attention to reading of pointer 21 of the ADF in order to keep the aircraft headed for the far central location of the LBM-R transmitter which will insure that the airplane rolls true to the runway center line although as the pointer 18 indicates the airplane touched down slightly right of the runway center. The switch 49 would of course have been placed in the "land" mode prior to intercepting the LOM marker.

What is claimed is:

1. In an aircraft blind landing director-system, the combination of a supporting frame attached to the aircraft, corelated mobile indicia responsive to aircraft attitude, aircraft turn, aircraft location with respect to radiated electronic space patterns of energy, aircraft speed through the atmosphere, aircraft altitude with respect to the atmosphere, aircraft altitude with respect to the landing runway, and aircraft distance along the runway; the mobile indicia being supported by the said frame and referenced to a horizon line and lubber line fixedly positioned within the frame, a gyroscope spinning on vertical axis, said gyroscope being suspended by gimbals allowing freedom in roll and pitch of 360 degrees, the said gyroscope having a case with associated axles, the axles supported in bearings in a gimbal, each axle terminating in gears which engage mating gears affixed to counter-shafts, the said counter-shafts supported at one end in the said gimbal, and shaped indicia affixed to the other end of the said counter-shafts, the said shaped indicia being positioned 180 degrees apart, each shaped indicia being viewable during selected phases of flight attitude of the said aircraft in order to measure pitch angle and roll angle against the said fixed horizon line, and each shaped indicia rotating oppositely to the rotation of the said gyroscope case axles, and in the field of view of the said co-related mobile indicia, a turn direction dial, said dial affixed to a synchro motor which is energized by a synchro generator affixed to direction sensing means, the said dial moving in directional rate and degree in proportion to aircraft turn rates and degree and in direction such that the composite movement of the shaped indicia with that of the said directional dial will present the normal visual stimulus of bank, pitch and turn normally seen by the pilot during visual contact flight, and superimposed upon the said indicia defining roll, pitch and turn, two co-related indicia which are responsive to the said radiated electronic space patterns of energy which define aircraft location in the vertical plane and in the horizontal plane respectively, the said indicia which are responsive to the said electronic energy space patterns being pointers affixed to galvanometers the same being made responsive to the energy emanating from ground-based navigational transmitters for imparting guidance to an aircraft in the horizontal and in the vertical plane, a radio altimeter, a glide slope transmitter-receiver combination, and the said index pointer, horizontally delineated, which selectively responds to signals received from either the glide slope receiver or the radio altimeter, selectively positioned marker beacon transmitters adjacent to an aircraft landing area, an airborne marker beacon receiver, switching means made responsive to the marker beacon receiver for selectively switching the horizontal pointer index to the output of the said radio altimeter after disconnection from the glide slope receiver as the aircraft passes through the electronic energy space pattern of the ground-based boundary marker transmitter, the said horizontal pointer index so disposed in correlation with the said fixed horizon line so that the horizontal pointer index coincides with the fixed horizon line as the radio altimeter signals zero height, the said selectively positioned marker beacon transmitters combined with a runway to provide means for consecutive receipt of their received signal by the airborne marker beacon receiver, a plurality of illuminated runway distance indicators, the said indicators being consecutively responsive to energization by received marker beacon signals as the said aircraft traverses the energy pattern of the said marker beacons, and each of the indicators remaining lighted until switchably extinguished, the said indicators providing means for determining the aircraft location along the said runway and the said indicators being displayed within the said correlated pattern of mobile indicia, a vertically disposed localizer pointer hinged to its associated galvanometer to swing in an arc either left or right of center in response to signals received by the localizer receiver from the ground-based localizer transmitter, and electrical means interconnecting the said localizer receiver with the said localizer galvanometer, and the said localizer pointer sensed to display a left or right or centralized locus of the aircraft with respect to the longitudinal axis of the landing runway, the said localizer pointer displayed in correlated association with the aforesaid mobile indicia, an automatc direction finder, electrical means connecting the output of said automatic direction finder with a synchro generator-motor system for activating an indicating means; said indicating means being disposed in the field of view with all the aforesaid mobile indicia, a barometric pressure sensitive altimeter, electrical means connecting it to a dial displayed within the correlated pattern of said mobile indicia, control knob means for adjusting the pressure altimeter reading by rotation of the pressure altimeter dial drive synchro motor case, and gear means connecting the said control knob and the said synchro motor case, and associated gear means engaging a geared barometric pressure scale indicating a selected pressure setting, an airspeed meter, electrical means connecting said airspeed meter to a dial displayed within the said correlated pattern of mobile indicia, a vertical speed meter, electrical means connecting said vertical speed meter to a dial for display within the correlated pattern of said mobile indicia, a partial mirror, means for positioning the said mirror to reflect images of selected indicia into functionally adequate and correlated juxtaposition with other indicia seen directly through the mirror to insure the presentation of biologically adequate visual stimulus to the pilot, the said visual stimulus providing substantially the same normal visual stimulus of clear weather flight and landing thus eliciting responses from the pilot which are prompt, and adequate in direction and degree, electric lamp means for illuminating the various indicia and means for controlling the intensity of the illumination.

2. In a device as described in claim 1, gyroscopic control means for positioning said shaped indicia in response to attitude positioning of the aircraft in which it is installed so that the roll and pitch angles displayed between the said shaped indicia and the fixed horizon line within the device are substantially the same in degree and sensing as the angles of roll and pitch of the aircraft with respect to the terrestrial surface and horizon.

3. In a device as described in claim 1, wherein said shaped indicia is in the form of an airplane.

References Cited by the Examiner
UNITED STATES PATENTS

| | | | |
|---|---|---|---|
| 2,321,582 | 6/1943 | Crane et al. | 244—77 |
| 2,613,350 | 10/1952 | Kellogg | 343—108 |
| 2,682,051 | 6/1954 | Fisher | 343—108 |
| 2,841,345 | 7/1958 | Halpert et al. | 343—108 X |
| 3,114,912 | 12/1963 | Tooley | 343—105 |

CHESTER L. JUSTUS, Primary Examiner.

H. C. WAMSLEY, Assistant Examiner.